Jan. 26, 1937. T. J. MURPHY 2,068,691
ARCING APPARATUS
Filed March 17, 1931
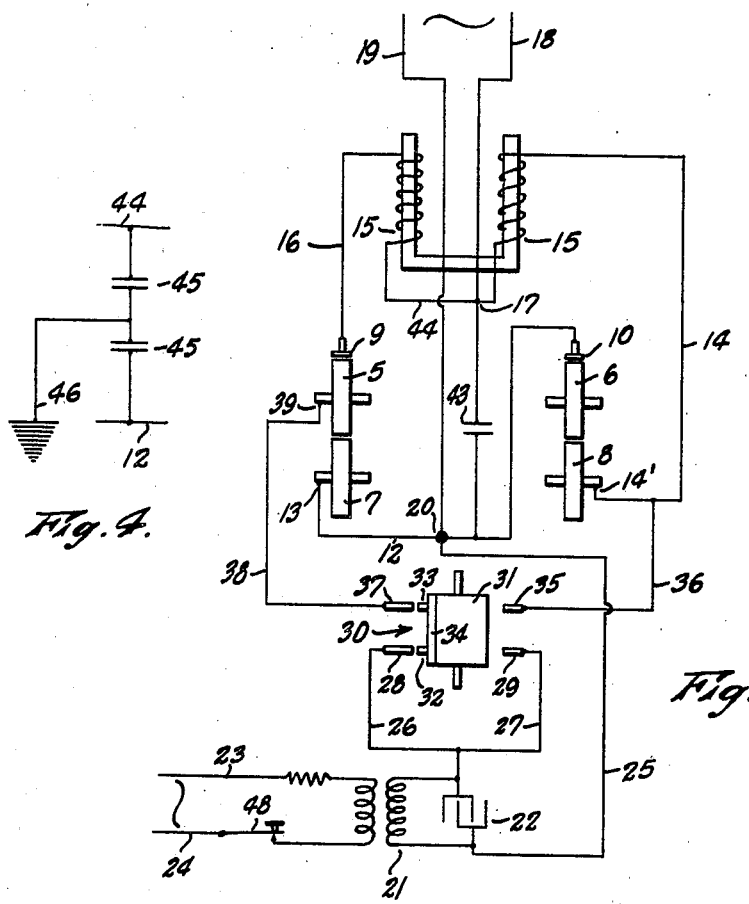
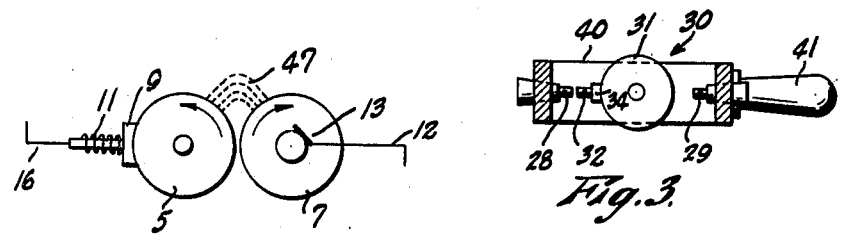
Inventor
Thomas J. Murphy
By Wooster & Davis
Attorneys Patented Jan. 26, 1937

2,068,691

UNITED STATES PATENT OFFICE 2,068,691

ARCING APPARATUS

Thomas J. Murphy, Stamford, Conn.

Application March 17, 1931, Serial No. 523,294

9 Claims. (Cl. 177—329)

This invention relates to an arcing apparatus, and has for an object to provide an apparatus for producing arcs of great length and intensity from alternating currents of relatively low amperage and voltage. As examples of uses for such a device, it would be very effective in aeronautical signaling and in any use where a large arc is desired.

With the foregoing and other objects in view the invention consists in certain novel features as will be more fully disclosed in connection with the accompanying drawing, it being understood that certain modifications may be employed without departing from the principles of the invention.

In this drawing:

Fig. 1 is a wiring diagram of one form of layout for securing the results noted, the various elements being indicated diagrammatically;

Fig. 2 is a diagrammatical side elevation of one pair of the rotating electrodes;

Fig. 3 is a partial section and partial side elevation showing diagrammatically a synchronizing circuit closer which may be used in the system; and Fig. 4 is a wiring diagram showing a modified arrangement which may be used for a certain effect as will later be described.

Generally speaking the arrangement consists of a double main circuit and an auxiliary circuit each of which is connected to a source of alternating current. In each side of the main circuit is a pair of arcing electrodes and in each electrode circuit is a large inductance for storing up energy during each half of the cycle to be discharged across the arcing electrodes alternately during the other half of the cycle, the auxiliary circuit being connected to the arcing electrodes and including a synchronized circuit closer and condenser to alternately establish a discharge across the arcing electrodes to permit a discharge from the energy storing means.

Referring to the drawing there is indicated at 5, 6, 7 and 8 two pairs of arcing electrodes. They are preferably of rotating cylindrical elements for purposes which will later be described. The electrodes 5 and 6 are known as the negative electrodes and are each separated from the corresponding positive electrodes 7 and 8 respectively by a short gap, and the electrodes of each pair are rotated in opposite directions as indicated in Fig. 2. The negative electrodes 5 and 6 may be of any suitable material but are preferably of graphite, and electrical connection is preferably made thereto by copper segments 9 and 10 pressed against their peripheries by suitable springs 11. The positive electrodes 7 and 8 are preferably of carbon impregnated with light giving metallic salts such for example as strontium nitrate. The reason for using the copper segments on the negative electrodes 5 and 6 is to remove any projections or fringes that might form on the edges of the electrodes, thereby keeping the gap between the positive and the negative electrodes regular. Wear on the negative electrodes from the arc is negligible, the greater part of the wear being on the positive electrodes, but even this is at a very low rate.

The positive electrode 7 is connected by lead 12 to the negative electrode 6 through the brush or segment 10. The connection to the positive electrode 7 is by means of a brush and slip ring 13. The positive electrode 8 is connected by a similar brush and slip ring 14' to a lead 14, connected at its opposite end to one end of the high inductance 15. The negative electrode 5 is connected to the other end of this high inductance through a lead 16 and the brush or segment 9. The mid point of this inductance is connected at 17 to one lead 18 from a source of alternating current which may be of relatively low voltage, the other lead 19 from this source of current being connected as shown at 20 to the lead 12 between the positive electrode 7 and the negative electrode 6. Thus it will be seen that these elements form a double main circuit connected to a source of alternating current with one pair of the arcing electrodes in each side of this circuit and the high inductance 15 connected in the circuit between the two pairs of electrodes.

The gaps between the two pairs of electrodes is sufficient to normally prevent passage of the current from the source of alternating current connected to the leads 18 and 19, and therefore an auxiliary circuit is provided having means to alternately establish an arc between the electrodes of the separate pairs. This circuit includes a small high tension transformer 21 arranged to charge the condenser 22, the transformer being connected by leads 23 and 24 to a source of alternating current. One side of the condenser 22 is connected by lead 25 to the lead 12 and is therefore connected to the positive electrode 7 and the negative electrode 6. The other side of the condenser 22 is connected by leads 26 and 27 to the insulated terminals 28 and 29 respectively. These terminals are in a synchronized timer indicated as a whole by the numeral 30. This timer includes a rotary insulated cylinder 31 carrying a pair of terminals 32 and 33 which are electrically connected through a conductor 34. Terminal 29 is one of a pair of terminals at one side of this cylinder, the other terminal being indicated at 35, and is connected by a lead 36 to the positive electrode 8. Terminal 28 is one of a pair of terminals on the other side of the cylinder, the other terminal of this pair being indicated at 37, and is connected by lead 38 to the negative electrode 5 through the brush and slip ring 39.

The rotating cylinder 31 of the synchronizing circuit closer 30 is mounted to rotate in the frame 40. This cylinder 31 rotates synchronously with the frequency of the alternating current from the source to which the main circuit is connected through the leads 18 and 19. The two sets of insulated terminals 29, 35 and 28, 37 are mounted in the frame 40 and are insulated therefrom, and are adjustable toward and from the cylinder 41 to adjust the gap between them and the terminals 32, 33 on the cylinder. Frame 40 may be provided with a handle 41 for giving the frame angular adjustable movement about the axis of cylinder 31 so that the frame may be turned to any position so that the terminals of the synchronizing cylinder will come into proximity to the pairs of stationary terminals mounted in the frame at any desired point in the curve of the current wave from the source of alternating current to which leads 18 and 19 are connected.

In the operation of the system, as the terminals 32 and 33 approach the terminals 28 and 37 there is a disruptive discharge of the condenser 22 across the terminals of the synchronizer which causes an arc to be formed between the electrodes 7 and 5, and as the terminals 32 and 33 approach the terminals 29 and 35 a similar arc will be formed between electrodes 8 and 6.

The condenser 22 is charged to high potential by small transformer 21, and then when the contacts 32 and 33 move into sparking distance to contacts 28 and 37 there is a disruptive discharge of this condenser across the gap between electrodes 5 and 7. This is because during the time of the discharge circuit 26, 34, 38, 5, 7, 12 and 25 is a local or auxiliary circuit of very low resistance and very low reluctance being without appreciable inductance, and we get a spark or discharge across gap 5 to 7 because as the frequency of this discharge is very high it jumps the gap between electrodes 5 and 7 rather than take any other path having appreciable inductance. When contacts 32 and 33 approach contacts 29 and 35 we have the same effect except that the discharge is across the gap between electrodes 6 and 8. Thus this synchronizer causes an arc to be formed alternately between the electrodes 7 and 5, and 8 and 6. The arc once established between either pair of electrodes reduces the resistance across the gap so that current from the alternating circuit having the lower potential immediately begins to flow and maintains the arc until the electromotive force equals the counter electromotive force. Thus the low tension supply to the main circuit will readily flow across the bridge established by the high tension discharge every half cycle.

The function of the high inductance 15 is to store up a large amount of energy during each half cycle and to alternately discharge this stored up magnetic energy into the arc gaps, thereby greatly intensifying the arcs. The inductance 15 is of relatively large proportions. Thus for example the core may have a cross section of about 3 to 5 inches and a total length for instance of about 2 feet, and therefore this inductance due to the rapid changes in the current gives a current discharge in the arcs of greatly increased voltage over the impressed voltage. In other words the inductance stores up a large amount of energy during each half cycle which is released during the next half cycle to the alternate gap.

It may be desirable to provide a small capacity condenser 43 between leads 12 and 44 to prevent the discharge spark of the auxiliary circuit from inducing a secondary simultaneous spark across the alternate set of rotating electrodes, because in that case there would be simultaneous sparks across the two gaps 5—7 and 6—8, instead of alternative as they should be, thereby causing complete neutralization of the inductive windings 15 as there would then be a complete circuit established from the same side of the A. C. supply through each branch of the main circuit in the same half cycle. This condenser acts as a sort of bleeder circuit for the inductive sparks, particularly where as in this case the currents in the auxiliary circuit are of an oscillatory character of high frequency. While this condenser is not absolutely necessary it prevents this secondary discharge should it tend to occur. An alternate arrangement is shown in Fig. 4 in which two condensers 45 may be connected between the leads 12 and 44 and grounded between them as indicated at 46. The condenser 43 may be of the capacity of about .001 m. f.

As shown in Fig. 2 the electrodes 5, 7 and 6, 8 are rotated in opposite directions at relatively high speeds. They thus tend to rapidly break the arc which further increases the energy stored in the inductance 15, and also forms a longer arc as it is carried to one side as indicated at 47, and this operation keeps the electrodes relatively cool and prevents rapid deterioration. The electrodes may be mounted on different shafts and rotated independently but electrodes 5 and 6 may be mounted on the same shaft while the electrodes 7 and 8 may be mounted on a separate similar shaft. When this device is used for signalling, a switch or other timing mechanism 48 may be located in the connection between the source of alternating current and the transformer 21 to cause flashes between the electrodes by opening and closing the primary of the small high tension transformer 21.

Thus it will be seen that with this system an alternating current of relatively low voltage can be used to produce arcs of relative high potential, and thus produce much more intense and longer arcs than could otherwise be produced.

Having thus set forth the nature of my invention, what I claim is:

1. In an arcing apparatus, a main circuit, means for connecting said circuit with a source of alternating current, said circuit comprising two paths connected with said connecting means in parallel, said paths each including a high inductance and a gap, said circuit being of insufficient potential to initiate a discharge across said gaps an auxiliary circuit having branches each connected to a corresponding branch of the main circuit so as to include the gap therein and including means for causing a disruptive discharge across said gaps, and means operating in synchronism with said current to cause said discharges across the gaps alternately.

2. In an arcing apparatus, a main circuit of alternating current potential having branches, an auxiliary circuit having branches, each of said circuits having a source of electric energy, the branches of the main circuit being connected in parallel with its source of electric energy and in series with each other independently of this source, a pair of spaced electrodes in each branch of the main circuit, said main circuit being of a potential insufficient to initiate a discharge across the gaps between the electrodes, the respective branches of the auxiliary circuit being each connected to a corresponding branch of the main circuit so as to include each pair of electrodes in the corresponding branch of the auxiliary circuit, said auxiliary circuit being of a high alternating current potential such as to initiate a discharge across the spaces between the electrodes, a high inductance in each branch of the main circuit with each pair of electrodes and the source of current, and means including a synchronous circuit closer for closing the auxiliary circuit across the electrodes in its respective branches alternately and in synchronism with the frequency of the current in the main circuit.

3. In an arcing apparatus, a main circuit of alternating current potential comprising paths connected in parallel to a single source of alternating current and having a gap in each path of the circuit, the potential of said circuit being of insufficient value to initiate a discharge across said gaps, means in each path for storing up energy to provide a discharge across said gaps of higher voltage than the source of supply, an auxiliary circuit connected to a source of current and having branches each connected to a corresponding path of the main circuit so as to include said gaps therein, said auxiliary circuit being of a high alternating current potential such as to initiate the discharge across said gaps, and means in the auxiliary circuit for causing a discharge across said gaps alternately and in synchronism with the frequency of the current in the main circuit.

4. In an arcing device, a main circuit of alternating current potential comprising branches connected in parallel to a single source of alternating current, a pair of spaced electrodes in each branch, the potential of said circuit being of insufficient value to initiate a discharge between said electrodes, a relatively high inductance in each branch, an auxiliary circuit connected to a source of current and having branches each connected to a corresponding branch of the main circuit to include the electrodes therein, said auxiliary circuit being of a high potential such as to initiate a discharge across the gaps, and means in the auxiliary circuit for causing a discharge across the pairs of electrodes alternately and in synchronism with the frequency of the current in the main circuit.

5. In an arcing device, a main circuit comprising connected branches, a pair of spaced electrodes in each branch, a high inductance in each branch, leads connected to a single source of alternating current of insufficient potential to normally cause a discharge across the gaps between the electrodes, one of said leads being connected to the main circuit between said inductances and the other lead being connected to the circuit intermediate the two pairs of electrodes on the opposite side thereof from the inductances, an auxiliary circuit connected to a source of current and having branches each connected to a corresponding branch of the main circuit so as to include the gaps therein said auxiliary circuit being of a high alternating current potential such as to initiate a discharge across said gaps, and means in the auxiliary circuit for causing a discharge across said gaps alternately and in synchronism with the frequency of the current in the main circuit.

6. In an arcing apparatus, a main circuit comprising connected parallel paths each including a high inductance and a gap, means for connecting said circuit to a single source of alternating current electric energy of insufficient potential to normally cause a discharge across said gaps, and means for forming a momentary arc across the gaps alternately and in synchronism with the frequency of the current in the main circuit to cause the main circuit to discharge across said gaps.

7. In an arcing apparatus, a main circuit of alternating current potential, means for connecting said circuit with a single source of electric energy, said circuit comprising two paths connected in parallel with said source and in series with each other, said paths each including a high inductance and a gap, said circuit being of insufficient potential to initiate a discharge across said gaps, and means for forming a momentary arc across the gaps alternately and in synchronism with the frequency of the current in the main circuit to permit discharge of the main circuit across said gaps.

8. In an arcing apparatus, a main circuit, means for connecting said circuit with a single source of electric energy, said circuit comprising two paths connected in parallel with said source and in series with each other to form an independent circuit, said paths each including a high inductance and a gap, said circuit having insufficient potential to initiate a discharge across said gaps, and means for forming a momentary arc across the gaps alternately to permit discharge of the main circuit across said gaps.

9. In an arcing apparatus of the character described, a main circuit, said circuit being divided into parallel branches, a relatively high inductance in each branch, a pair of electrodes in each branch forming a spark gap of predetermined length, a source of alternating current of relatively low voltage connected in said circuit the potential of said source being insufficient alone to initiate a discharge across said gaps, a second auxiliary circuit, a condenser connected across said auxiliary circuit one terminal of said condenser being connected to one electrode of each pair, means including a circuit closing device connected to the other terminal of said condenser for alternately connecting said other terminal with the other electrode of each pair, means for driving said device at a speed in synchronism with the frequency of said alternating current source, and a source of relatively high potential connected across the terminals of said condenser, said second mentioned source being of sufficient value to initiate a discharge across the gaps.

THOMAS J. MURPHY.